United States Patent [19]
Cassidy et al.

[11] 3,821,357
[45] June 28, 1974

[54] COMPLEX ALUMINUM PHOSPHATES

[75] Inventors: John Edward Cassidy; Philip Glenn Millar, both of Runcorn, England

[73] Assignee: Imperial Chemical Industries Limited, London, England

[22] Filed: Apr. 18, 1972

[21] Appl. No.: 245,196

[30] Foreign Application Priority Data
Apr. 28, 1971  Great Britain.................... 11880/71

[52] U.S. Cl. .............................................. 423/300
[51] Int. Cl. ........................................... C01b 25/10
[58] Field of Search .................. 423/300, 304–313, 423/301

[56] References Cited
UNITED STATES PATENTS

| | | | |
|---|---|---|---|
| 2,405,884 | 8/1946 | Gregor | 423/309 |
| 2,460,344 | 2/1949 | Gregor | 423/309 |
| 2,538,867 | 1/1951 | Gregor | 423/309 |
| 3,386,800 | 6/1968 | Brader | 423/309 |
| 3,401,013 | 9/1968 | Rohlfs et al | 423/310 |

*Primary Examiner*—Oscar R. Vertiz
*Assistant Examiner*—Gregory A. Heller
*Attorney, Agent, or Firm*—Cushman, Darby & Cushman

[57] ABSTRACT

Complex halogen-containing aluminum phosphates are prepared by contacting aluminum orthophosphate hydrate with hydrogen chloride, bromide or iodide. The complexes produced are useful as refractory binders.

9 Claims, No Drawings

COMPLEX ALUMINUM PHOSPHATES

This invention relates to solid complex aluminium phosphates and their preparation, and in particular to complex aluminium phosphates containing halogen and chemically bound water.

In our co-pending U.K. Pat. application No. 29,862/69 (corresponding to Dutch Pat. application No. 7,008,594) we described halogen-containing complex phosphates of aluminium containing chemically bound water.

These complex phosphates are useful in the form of their aqueous solution for the binding of solids, especially refractory solids, as described, for example, in our co-pending U.S. Pat application No. 324,840 and U.K. Pat. application No. 12,544/70 (corresponding to Dutch Pat. application No. 7,103,318). Two methods of preparing the solid complex are described in our U.S. Pat. application No. 274,964 and UK Pat. application No. 29,862/69. In the first method the solid complex may be obtained by crystallisation from aqueous solution. However, this crystallisation process is difficult to initiate and the solid may take days or even weeks to crystallise. Moreover, as the solution is highly acidic it is very corrosive and special materials of construction must be used for the crystallisation vessel. In the second method, the solid complex is obtained by hydrolysis of an analogous ethanol-containing complex. This method involves two steps; firstly the preparation of the ethanol-containing complex and secondly the hydrolysis step.

We have now found that certain of these solid complex aluminium phosphates may be prepared in a single stage by reacting a hydrated aluminium orthophosphate with hydrogen chloride, bromide or iodide.

According to the present invention there is provided a process for preparing water-soluble solid halogen-containing complex phosphates of aluminium containing chemically bound water which comprises contacting aluminium orthophosphate hydrate with a hydrogen chloride, bromide or iodide.

The use of hydrogen chloride is the most important because of its ready availability, and because the product made using hydrogen chloride is especially useful.

The hydrogen halide used may be in liquid or gaseous form. When using hydrogen chloride, we prefer that it be in gaseous form since the gas reacts readily with aluminium orthophosphate hydrate at ambient temperature and pressure.

We prefer to contact the aluminium phosphate hydrate with the reactant gas at a temperature not exceeding 100° C, and especially preferably at a temperature not exceeding 50° C, for example at a temperature between ambient temperature (e.g. 15° C to 20° C) and 50° C, although lower temperatures may be used if desired. A convenient temperature range for the process is 30° C to 40° C. The temperature may be maintained in the desired region by appropriate heating or cooling, for example by cooling to prevent the heat of reaction from causing the temperature to rise unduly. The reaction between the aluminium orthophosphate hydrate and hydrogen chloride gas is exothermic and is, in practice, conveniently maintained at the desired temperature by controlling the rate of supply of the hydrogen chloride.

When the hydrogen halide is in gaseous form, it may conveniently be diluted with a gas which is inert to the reaction conditions, for example nitrogen or air, especially when it is desired to assist the removal of the heat of the reaction. A mixture of reactant gas and diluent containing 5 to 50 percent, and conveniently about 10 percent, by volume of the former is especially useful, the diluent gas being preferably nitrogen. In a preferred procedure, using a fluidised bed reactor, the concentration of hydrogen chloride in a mixture of hydrogen chloride and inert diluent is increased as the reaction proceeds.

The process may be carried out at any convenient pressure, although higher pressures than atmospheric are favoured when using hydrogen bromide or hydrogen iodide, for example of up to 20 atmospheres or more may be employed. If it is desired to use hydrogen halide in liquid form, high pressures will generally be necessary.

The aluminium orthophosphate hydrate should be at least the dihydrate and preferably contains 2.5 to 4 molecules of water. We especially prefer to use the trihydrate, which may be prepared in known manner by reacting aluminium sulphate and sodium phosphate and filtering and drying the precipitate to give the desired hydrate. In practice the exact water content of the trihydrate may vary slightly but for use in the present process the water content is preferably in the range 2.7 to 3.3 moles per mole (as determined by weight loss on ignition).

The aluminium orthophosphate hydrate is preferably in a finely divided form to promote contact with the reactant gas, and is preferably agitated while the reactant gases are brought into contact with it. When the aluminium orthophosphate hydrate is to be agitated as a powder it is preferable for it to be substantially dry so that moisture will not interfere with its free-flow properties. The reactant gases and/or diluent gases are also preferably used substantially dry.

The process may be carried out in any form of apparatus which provides sufficient contact between the reactant gases and the aluminium orthophosphate hydrate. The reaction vessel may for instance take the form of a rotary drum which may have one or more mixing baffles attached to its walls and may be rotated about a horizontal axis or about an axis inclined away from the horizontal so as to cause flow of the aluminium orthophosphate hydrate particles from one end to the other and the particles may then be passed continuously through the reactor. Alternatively, a fixed reaction vessel may be employed with stirring paddles or screws to provide agitation. Alternatively, the reaction may conveniently be carried out by a fluidised bed technique. The particulate bed may be fluidised by the reactant gas or by a mixture of reactant gas and an inert gas, for example nitrogen. The fluidised bed may advantageously be stirred, especially to prevent any tendency to "channelling" of the fluidising gases through the bed. The materials of construction of the reactor equipment may with advantage be chosen to withstand the corrosive action of the reactant gas.

Vent gases from the reactor may be recycled to the reactor if desired.

The invention is illustrated, but not limited, by the following Examples.

EXAMPLE 1

100 g of powdered aluminium orthophosphate trihydrate were placed in a cylindrical glass vessel equipped at its base with an inlet tube terminating in a sinter funnel through which a dry mixture of nitrogen (200 litre/hour) and hydrochloric acid gas was passed. Waste gases were vented to atmosphere. The reaction mass was stirred by means of a paddle stirrer rotating coaxially in the glass vessel. The temperature of the reaction mass was maintained at 35° to 40° C by varying the concentration of the hydrogen chloride in the nitrogen. Initially the hydrogen chloride was passed at a rate of 7 litres/hour. After 15 minutes the hydrogen chloride flow rate was increased to 15 litres/hour. After a further 30 minutes the hydrogen chloride flow rate was increased to 20 litres/hour and maintained at this level for 30 minutes. The nitrogen flow was then stopped and the hydrogen chloride flow rate increased to 30 litres/hour. After ten minutes the temperature fell and the gas flow was shut off. The white product solid was removed from the vessel and analysed.

Elemental analysis gave the following percentages by weight of the constituents of the product, which was shown to be a single substance:

| Al | $PO_4$ | Cl | $H_2O$ |
|---|---|---|---|
| 12.2 | 42.3 | 16.8 | 24.7 |

This analysis corresponds to an empirical formula of $AlPClH_7O_7$ which may be represented as $AlPO_4 \cdot HCl \cdot 3H_2O$.

Differential thermal analysis under nitrogen on a sample of the product showed a strong endothermic peak when heated over the temperature range 20° to 400° C. The decomposition corresponding to this endothermic peak begins at 90° to 100° C and ends at 190° to 200° C. The point of maximum decomposition is at 148° to 152° C.

Thermogravimetric analysis under nitrogen showed that the product had a significant weight loss beginning at 50° C and ending at 200° C.

The infra-red absorption spectrum of the product was measured. The principal band positions are given in Table 1 which indicates the relative strengths of the bands.

BAND POSITIONS IN RECIPROCAL CENTIMETRES 3,300 strong
2,450 very weak
1,635 medium strong
1,150 strong
925 weak
505 medium The product was water-soluble and useful as a binder.

EXAMPLE 2

Aluminium phosphate trihydrate (5 g) was placed in a test-tube inside a pressure vessel. Hydrogen bromide gas was then admitted to the sealed system giving a pressure of 20 atmospheres at 24° C for 1 hour. The pressure vessel remained open to the hydrogen bromide source throughout the experiment. The hydrogen bromide was blown off and residual traces were removed by evacuation.

The product was a water-soluble brownish solid, useful as a binder and contained aluminium to bromine in a ratio of substantially 1:1.2.

EXAMPLE 3

200 g. of powdered aluminium orthophosphate trihydrate was placed in 2 inch diameter tube and fluidised by passing a mixture of nitrogen and hydrogen chloride into the base of the tube at a rate of 60 litres/hour. The reaction was continued for a period of 2 hours, the concentration of hydrogen chloride in the gaseous mixture being gradually increased from 5% to 50% by volume. The nitrogen flow was turned off and hydrogen chloride gas passed through at 30 litres/hour for 15 minutes.

A white solid product was obtained which was water-soluble and had a composition corresponding to $AlPO_4 \cdot HCl \cdot 2.9 H_2O$.

EXAMPLE 4

The procedure of Example 3 was repeated using samples of aluminium phosphate trihydrate whose water content had been accurately determined by measurement of the weight loss of the sample on ignition at 1,000° C. It was found that the amount of hydrogen halide which reacted depended on the exact water content of the trihydrate starting material:

| Weight loss on ignition | $x$ in $AlPO_4 \cdot xH_2O$ | % chloride in product | $y$ in $AlPO_4 \cdot xH_2O \cdot yHCl$ |
|---|---|---|---|
| 36% | 3.8 | 19.8% | 1.3 |
| 30.7% | 3.0 | 16.7% | 1.0 |
| 27.2% | 2.5 | 14.1% | 0.8 |

In each case the product was water-soluble although the solubility decreased with decreasing chloride content.

We claim:

1. A process for the preparation of water-soluble solid complex phosphates of aluminium containing chemically bound water and a halogen selected from chlorine, bromine and iodine which comprises contacting aluminium orthophosphate hydrate having the formula $AlPO_4 \cdot xH_2O$ where $x$ is at least 2.5 with hydrogen halide selected from hydrogen chloride, bromide or iodide, at temperatures between 0° and 100° C.

2. A process as claimed in claim 1 wherein the hydrogen halide is in gaseous form.

3. A process as claimed in claim 2 wherein the hydrogen halide is admixed with a gaseous diluent.

4. A process as claimed in claim 1 wherein $x$ is in the range 2.7 to 3.3.

5. A process as claimed in claim 1 wherein the aluminium orthophosphate hydrate and hydrogen halide are contacted at a temperature in the range 0° to 50° C.

6. A process as claimed in claim 1 wherein the aluminium orthophosphate hydrate and hydrogen halide are contacted at ambient pressure.

7. A process as claimed in claim 1 wherein the aluminium orthophosphate hydrate and hydrogen halide are contacted at superatmospheric pressure.

8. A process as claimed in claim 1 wherein the aluminium phosphate hydrate is in finely divided form.

9. A process as claimed in claim 8 wherein the aluminium orthophosphate hydrate is fluidized by a stream of gas comprising hydrogen chloride.

* * * * *